(12) United States Patent
Papakonstantopoulos et al.

(10) Patent No.: US 12,036,756 B2
(45) Date of Patent: Jul. 16, 2024

(54) SELF SEALING TIRE (71) Applicant: THE GOODYEAR TIRE & RUBBER COMPANY, Akron, OH (US)

(72) Inventors: George Jim Papakonstantopoulos, Medina, OH (US); Michael Lawrence Gersman, Cleveland, OH (US); Frank J. Feher, Copley, OH (US); Stephan Rodewald, Dubuque, IA (US)

(73) Assignee: The Goodyear Tire & Rubber Company, Akron, OH (US)

( * ) Notice: Subject to any disclaimer, the term of this patent is extended or adjusted under 35 U.S.C. 154(b) by 212 days.

(21) Appl. No.: 17/468,049

(22) Filed: Sep. 7, 2021

(65) Prior Publication Data
US 2022/0097326 A1 Mar. 31, 2022

Related U.S. Application Data (60) Provisional application No. 63/084,898, filed on Sep. 29, 2020.

(51) Int. Cl.
| | | |
|---|---|---|
| B29C 73/16 | (2006.01) | |
| B29D 30/06 | (2006.01) | |
| C08K 5/14 | (2006.01) | |
| C08L 23/12 | (2006.01) | |
| C08L 23/22 | (2006.01) | |
| B29K 23/00 | (2006.01) | |
| B29K 423/00 | (2006.01) | |
| B29L 30/00 | (2006.01) | |

(52) U.S. Cl.
CPC ........ *B29C 73/163* (2013.01); *B29D 30/0685* (2013.01); *C08K 5/14* (2013.01); *C08L 23/12* (2013.01); *C08L 23/22* (2013.01); *B29D 2030/0695* (2013.01); *B29K 2023/22* (2013.01); *B29K 2423/12* (2013.01); *B29L 2030/00* (2013.01)

(58) Field of Classification Search
CPC .............. B29C 73/163; B29D 30/0685; B29D 2030/0695; B29K 2023/22; B29L 2030/00; C08K 5/14; C08L 23/12; C08L 23/22
See application file for complete search history.

(56) References Cited

U.S. PATENT DOCUMENTS

| | | | |
|---|---|---|---|
| 1,419,470 | A | 6/1922 | Reasoner et al. |
| 1,601,013 | A | 9/1926 | Wildman |
| 1,977,281 | A | 10/1934 | Knowlton |
| 2,877,819 | A | 3/1959 | Gibbs |
| 3,048,509 | A | 8/1962 | Sweet et al. |
| 4,089,360 | A | 5/1978 | Bohm |
| 4,140,167 | A | 2/1979 | Bohm et al. |
| 4,228,839 | A | 10/1980 | Bohm et al. |
| 4,426,468 | A | 1/1984 | Ornum et al. |
| 4,913,209 | A | 4/1990 | Hong et al. |
| 5,085,942 | A | 2/1992 | Hong et al. |
| 5,295,525 | A | 3/1994 | Sanda, Jr. |
| 6,837,287 | B2 | 1/2005 | Smith, Sr. et al. |
| 8,221,849 | B2 | 7/2012 | Naito |
| 8,360,122 | B2 | 1/2013 | Wilson |
| 9,427,918 | B2 | 8/2016 | Son et al. |
| 9,677,025 | B2 | 6/2017 | Voge et al. |
| 9,802,446 | B2 | 10/2017 | Dahlke et al. |
| 10,730,255 | B2 | 8/2020 | Barjon et al. |
| 2006/0229402 | A1 | 10/2006 | Varma |

FOREIGN PATENT DOCUMENTS

| | | | | |
|---|---|---|---|---|
| EP | 0135463 | A1 | 3/1985 | |
| EP | 2039500 | A1 | 3/2009 | |
| EP | 2045103 | A1 | 4/2009 | |
| EP | 3572218 | A1 * | 11/2019 | ........... B29C 73/163 |
| EP | 3572218 | A1 | 11/2019 | |
| GB | 2082191 | A | 3/1982 | |
| JP | 2003055528 | A | 2/2003 | |

OTHER PUBLICATIONS

JP 2003-080909 machine translation (Year: 2003).*

* cited by examiner

*Primary Examiner* — Edward J Cain
(74) *Attorney, Agent, or Firm* — Alvin T. Rockhill (57) ABSTRACT

This invention reveals a method of manufacturing a puncture sealing pneumatic rubber tire which comprises: (1) building an unvulcanized tire including a circumferential rubber tread, a supporting carcass therefor, two spaced beads, two rubber sidewalls connecting said beads, an inner liner and a solid sealant formulation layer disposed inwardly from said supporting carcass and outwardly from said inner liner, wherein said solid sealant formulation layer is comprised of (a) polyisobutylene, (b) a peroxide, and (c) a reinforcing filler, wherein the polyisobutylene is present in the sealant layer at a level of at least 50 weight percent; and (2) shaping and vulcanizing said tire in a tire mold under conditions of heat and pressure and simultaneously forming in situ a puncture sealant layer in said tire by both crosslinking and partially depolymerizing said polyisobutylene rubber in said sealant layer formulation.

20 Claims, 1 Drawing Sheet

SELF SEALING TIRE

This application claims benefit of U.S. Provisional Patent Application Ser. No. 63/084,898, filed on Sep. 29, 2020. The teachings of U.S. Provisional Patent Application Ser. No. 63/084,898 are incorporated herein by reference in their entirety.

FIELD OF THE INVENTION

This invention relates to a pneumatic tire of the tubeless type with puncture sealing properties, the puncture sealing composition used in such tires, and the method for manufacturing such tires.

BACKGROUND OF THE INVENTION

Historically, puncture sealing tires have been designed in such a way so as to retard or prevent the loss of air and consequential deflation of the tire after being punctured with a sharp object, such as a nail. Pneumatic tires with puncture sealing capabilities have been described in the literature since at least the first part of the twentieth century (see U.S. Pat. Nos. 1,419,470, 1,601,013, and 1,977,281). Such early self-sealing tires were of a relatively simple design that generally included an unvulcanized layer of rubber which would theoretically flow into the puncture and seal it so as to prevent air loss. However, in actual practice such self-sealing tires were not very effective and consequently were of limited value.

Over the years better puncture sealing tires have been developed which allow for the tire to provide longer service after being punctured. In many cases, this provides for the continued use of the tire until it can be driven to a more convenient location for it to be repaired or replaced. For instance, it would be highly desirable if the vehicle on which the tire is installed could be driven to a garage or a tire service center for repair rather than being required to change the tire on a busy road, under inclement weather conditions, or in a less than desirable neighborhood. In any case, more and more sophisticated tire constructions, sealant compositions and methods for manufacturing self-sealing tires have been developed. In most of these designs a sealant material is encased or encapsulated in between layers of the tire. For example, U.S. Pat. No. 2,877,819 discloses a unitary tubeless pneumatic tire, comprising a hollow casing of fabric reinforced vulcanized, rubber-like elastic material and including a circumferential tread portion of substantial width and opposite sidewalls extending radially inwardly therefrom, and an annular puncture-sealing body of substantial width on the inner periphery of said casing in laterally centered relation with respect to said tread portion and sidewalls, said body including radially inner and outer walls of rubber-like material integrally connected at laterally spaced peripheral side portions of the body and said outer wall being integrally connected at laterally spaced peripheral side portions of the body and said outer wall being integrally cured to the elastic material of said fabric reinforced casing, said body having web portions integrally connecting between said inner and outer walls thereof defining a plurality of separate calls completely around the body, and said cells containing puncture-sealing material, said web portions being uniformly relatively thin, whereby said cellular body between said inner and outer walls thereof is predominantly puncture sealing material so that a puncturing object penetrating the tread portion of said casing and said body at substantially any point must pass through sufficient said puncture sealing material to seal against escape of inflation air through the puncture made by the puncturing object.

U.S. Pat. No. 3,048,509 discloses a laminated puncture sealing strip for pneumatic tires comprising a plurality of superposed sealing sheets that are not more than about one-tenth inch or less than about one-twentieth inch in thickness and that are composed of a soft sticky unvulcanized synthetic rubber sealing composition comprising a copolymer of 1,3-butadiene and styrene which contains at least 50% by weight of the diene combined with 35 to 115 parts by weight of softening and tackifying agents per 100 parts of the copolymer and with from 35 to 65 parts by weight of a pigment per 100 parts of the copolymer, said softening and tackifying agents and pigments being so proportioned that said sealing composition has a plasticity of from 20 to 35 as measured on a Neodoptifa-Hoekstra plastometer, and means for restricting flow of the sealing composition and for protecting the same against deterioration comprising separating and covering sheets alternating with the sealing sheets, said separating and covering sheets being thinner than said sealing sheets and being composed mainly of a vulcanized rubber compound the principal rubbery component of which is selected from the group consisting of a polymer of chloroprene and styrene-butadiene rubbers than contain at least 50% by weight of the diene, said rubber compound being substantially free from sulfur and migratory curing agents. U.S. Pat. No. 4,089,360 discloses a pneumatic tire having a laminate as an abrasion gum strip or an innerliner wherein said laminate is comprised of at least two groups of layers with each group having at least one layer and each layer of said laminate comprising a rubber compound having an unsaturated, amorphous polymer selected from the group consisting of natural rubber and synthetic rubber and each layer having sulfur and sulfur cure accelerators so that said layers will vulcanize when exposed to a subsequent vulcanization treatment, said laminate manufactured by the steps comprising providing at least one layer of a first group with a component selected from the group consisting of paradichlorobenzene and the thioether-polythiols; providing at least one layer of a second group with components selected from the group consisting of 2,6-di-t-butyl-p-cresol; phenyl beta-naphthylamine; 4,4' thiobis (6-t-butyl-m-cresol); N-(1,3-dimethylbutyl) N' phenyl-p-phenylene diamine; syn-di-betanaphthyl-p-phenylene diamine; and aromatic oils; said components yielding different degrees of cross-linkage in said layers when said layers are subjected to irradiation; assembling at least one of said layers from each said group into contiguous relationship to form a laminate; subjecting said laminate to irradiation so that at least two of said layers are cross-linked to a different degree; assembling said laminate into said tire and vulcanizing said tire.

U.S. Pat. No. 4,140,167 discloses a pneumatic tire comprising as one of its rubber elements a laminate comprising at least five layers of rubber compounds produced by providing at least two outer layers with a desensitizing agent which retards cross-linkage when subjected to irradiation, providing two inner layers of said laminate with a sensitizing agent which promotes cross-linkage when subject to irradiation, providing a middle layer located between said sensitized layers with a material which degrades when exposed to irradiation, assembling said laminate with said middle layer located between the two sensitized layers and the one of said desensitized layers located outside of each of said sensitized layers, subjecting said laminate to irradiation so that said layers are differentially cross-linked with said sensitized layers being cross-linked to a greater degree than said desensitized layers and said middle layer being degraded to yield a soft product, assembling said laminate into said tire and vulcanizing said tire. The degraded polymeric material utilized in such tires can be polyisobutylene, copolymers containing polyisobutylene, or polyethylene oxide, and the cross-linked polymeric material can be natural rubber, copolymers of butadiene and styrene and halogenated butyl rubber.

U.S. Pat. No. 4,228,839 discloses a self-sealing pneumatic tire comprising an annular road-engaging tread surface, two sidewalls each connecting a side of said tread surface to an annular bead, reinforcing body plies extending from one bead to the other through the sidewalls and tread and a puncture-sealant layer located in the crown area of said tire radially inward of said reinforcing body plies, said puncture-sealant layer comprising a blend of a first polymeric material that degrades on exposure to irradiation and a second polymeric material that crosslinks on exposure to irradiation, vulcanization temperatures or both to form an elastic matrix for said first polymeric material, said tire manufactured by the steps comprising providing a layer comprised of blended rubber compound with said blend of said first and second polymeric materials, assembling said layer into an unvulcanized tire as its innermost layer in the crown area, vulcanizing said tire, and subsequently irradiating said tire to degrade said first polymeric material whereby said first polymeric material forms a tacky material in said second crosslinked polymeric material which acts as an elastic matrix for said first polymeric material, whereby said layer with said polymeric material combination has puncture sealing properties. In these tires, the first polymeric material can be polyisobutylene or a copolymer of polyisobutylene and the second polymeric material can be a halogenated butyl rubber, an ethylene propylene terpolymer, polybutadiene rubber, a copolymer of styrene and butadiene, a block copolymer, a butadiene acrylonitrile copolymer, natural rubber, polyisoprene, or neoprene.

U.S. Pat. No. 4,426,468 describes a self-sealing composition for a tire based on crosslinked butyl rubber having a very high molecular weight. U.S. Pat. No. 4,426,468 more specifically describes a butyl rubber based sealant composition, the butyl rubber constituent of which is present only in the form of a copolymer having a viscosity average molecular weight in excess of 100,000, comprising the reaction product of said butyl rubber, a curing system including a cross-linking agent selected from the group consisting of at least 2 parts by weight of a quinoid cross-linking agent per hundred parts butyl rubber and at least 5 parts by weight of a phenolic cross-linking agent per hundred parts butyl rubber, and at least one tackifier compatible with butyl rubber, and a filler material, the composition being compounded such that it has a tensile strength of at least 30 psi, an elongation of at least 600% and a cross-link density such that its swell ratio in toluene is between 12 and 40. However, butyl rubbers have the drawback of exhibiting a high level of hysteresis over a broad temperature range which increased the rolling resistance of tires and is detrimental of fuel economy.

As an alternative to butyl rubbers self-sealing compositions for tires can also be made using unsaturated diene elastomers, including natural rubber. Such compositions are described in U.S. Pat. Nos. 4,913,209, 5,085,942, and 5,295,525. These compositions are characterized by the combined presence of a high content of hydrocarbon resin as tackifier, always greater than 100 parts by weight per hundred parts. In addition, a large amount of liquid elastomer gives a high fluidity to the composition which is a source of other drawbacks, in particular a risk of the self-sealing composition flowing during use at relatively high temperature (typically above 60° C.) frequently encountered during the use of the tires in certain geographical regions.

U.S. Pat. No. 6,837,287 describes a method of manufacturing a pneumatic rubber tire having an outer circumferential tread, a supporting carcass therefore, and an inner liner disposed inwardly from said supporting carcass, containing a puncture sealant layer positioned between said inner liner and said carcass, the steps of which comprise, based upon parts by weight per 100 parts by weight uncured butyl rubber (phr): (A) providing a butyl rubber-based rubber composition comprised of: (1) 100 phr of uncured star branched butyl rubber, (2) about 1 to about 35 phr of a particulate precured rubber, selected from resin-cured butyl rubber and/or sulfur-cured diene-based rubber, homogeneously dispersed in said uncured butyl rubber, and (3) about 1 to about 16 phr of organoperoxide; (B) assembling said butyl rubber based rubber composition as a layer into an unvulcanized rubber tire between said carcass and said innerliner during the tire building process; and (C) shaping and curing said rubber tire at a temperature in a range of about 130° C. to about 170° C. for a sufficient period time to partially depolymerize said uncured butyl rubber in said butyl rubber-based rubber composition layer, wherein said particulate precured rubber substantially remains in its pre-cured condition as a particulate dispersion within said partially depolymerized butyl rubber.

U.S. Pat. No. 8,221,849 discloses a method of producing a self-sealing pneumatic tire comprising the steps of: injecting a viscous sealant material onto an internal surface of a vulcanization molded pneumatic tire; rotating the pneumatic tire around a tire axis while forming the sealant material into a sealant layer diffused in a sheet form by centrifugal force, injecting a cover material comprising an unhardened rubber-based material or a resin-based material onto the internal surface of the sealant layer; rotating the pneumatic tire around the tire axis while forming the cover material into a cover sheet layer diffused in a sheet form by centrifugal force; and hardening the cover sheet layer by irradiating with an electron beam, infrared rays, ultraviolet rays, or ultrasonic waves.

U.S. Pat. No. 8,360,122 describes a tire sealant material composition comprising at least one non-halogenated butyl rubber, and 2,2'-dibenzamido-diphenyldisulfide, the sealant material composition having a viscosity that permits the sealant material composition to be incorporated into a tire during a tire building process and to degrade to a lower viscosity that permits the resulting degraded sealant material composition to flow into and seal a puncture in a tire.

U.S. Pat. No. 9,427,918 discloses a color sealant composition for a tire, comprising: 100 parts by weight of a raw rubber, 10 to 60 parts by weight of surface modified silica prepared by placing silica at 300° C. to 500° C. for 30 minutes to 3 hours, 0.05 to 5 parts by weight of pigment, 40 to 100 parts by weight of polybutene having a number average molecular weight of 1,000 to 1,500, 60 to 300 parts by weight of polybutene having a number average molecular weight of 2,000 to 3,000, and 5 to 15 parts by weight of peroxide. The raw rubber in this tire sealant composition can be natural rubber, butyl rubber, or a blend of natural rubber and butyl rubber.

U.S. Pat. No. 9,677,025 describes an inflatable article comprising a puncture-resistant layer, said layer comprising an elastomer composition having a self-sealing property, wherein the composition comprises: a blend of at least two solid elastomers, a polybutadiene or butadiene copolymer elastomer, referred to as "elastomer A", and a natural rubber or synthetic polyisoprene elastomer, referred to as "elastomer B", the elastomer A: elastomer B ratio by weight being within a range from 10:90 to 90:10; between 30 phr and 90 phr of a hydrocarbon resin; and from 0 to less than 30 phr of filler.

U.S. Pat. No. 9,802,446 discloses a pneumatic vehicle tire comprising a tread, an inner layer, and a tire sealant disposed upon the inner layer and opposite the tread; wherein the tire sealant comprises expanded solids comprising expandable graphene structures and microspheres; wherein the expanded solids are incorporated into the tire sealant in an amount of from 1 weight percent to 20 weight percent and, wherein the tire sealant provides sealing by flowing into a defect site penetrating the tread and the inner layer.

U.S. Pat. No. 10,730,255 describes a method of applying a rubber-based self-sealing composition on an inner surface of a tire casing, comprising the steps of: introducing a non-crosslinked self-sealing composition into an inlet of an extrusion device; adjusting speed and temperature conditions of the extrusion device so that, at an application nozzle forming an outlet die of said extrusion device, the self-sealing composition is crosslinked, and bringing the application nozzle close to the inner surface of said casing previously set in relative motion with respect to the application nozzle, and depositing an extruded and crosslinked bead having a given width and profile directly on said internal surface of the casing; wherein the extrusion device includes an assembly comprising a screw rotated in a barrel, the extrusion device further including a duct positioning downstream of the assembly that opens into the application nozzle; wherein the extrusion device includes a plurality of zones, and the method further includes increasing the temperature of the composition in a first zone to a set point temperature between 140° C. and 220° C. during a first period of time, maintaining the temperature at the set point temperature in a second zone for a second period of time, and increasing the temperature in a third zone for a third period of time, wherein the third period of time is shorter relative to the second period of time; wherein the third zone includes the duct and the application nozzle.

Many additional methods, sealants and tire constructions have been suggested for puncture sealant pneumatic tires. However, all of these ideas have had certain drawbacks. For example, the use of fluid puncture sealant coatings which seal by flowing into the puncture hole are frequently unsuccessful primarily because sealant coatings may flow excessively and thus tend to cause the tire to become out of balance. In other cases the sealant coating is not operable or effective over a wide temperature range extending from hot summer to cold winter conditions. Central cores of cellular material which will physically maintain the shape of the tire when punctured can place a restriction on the maximum speed of a vehicle on which they are used because of potential breakdown or destruction of the cells caused by the effects of heat and distortion. More complicated structures wherein the sealant material is encased in a vulcanized material are usually expensive to manufacture and can also create balance and suspension problems due to the additional weight required in the tire.

Puncture sealing tires can be built wherein a layer of degraded rubber which is tacky or gummy (of low viscosity) is assembled into the unvulcanized tire. This method of construction is usually only reasonably possible when the degraded layer of rubber is laminated with another undegraded layer which permits its handling during the tire building procedure. This is because the tacky, sticky nature and lack of strength in degraded rubber make it very difficult to handle alone without additional support and a barrier to keep it from sticking to a tire building machine or curing apparatus. By laminating the degraded rubber layer between two or more undegraded rubber layers it is capable of retaining its structural integrity during the tire building and vulcanization process wherein high pressures are applied to the tire which would displace the degraded rubber layer from its desired location if not laminated. Such a lamination procedure adds greatly to the cost of building a tire. Thus, such lamination procedures have not been widely accepted on a commercial basis for building puncture sealing pneumatic tires.

The most common commercial approach used in manufacturing self-sealing tires is to build a layer of degradable material which can be easily handled into the tire. This layer of degradable material is sandwiched between other layers of the tire. In many cases it will be positioned between two layers of innerliner or between the innerliner and the supporting carcass of the tire. In any case, this degradable material breaks down at the elevated temperatures which are employed during the vulcanization of the tire into a low viscosity, tacky material. This approach greatly facilitates the tire building procedure by eliminating the need to handle such a sticky material when the tire is being built.

There is a continuing desire for high quality pneumatic tires having an effective puncture sealing feature and for simple, low cost methods for manufacturing such tires on a commercial basis. However, challenges still remain in the field of manufacturing highly effective self-sealing tires without compromising tire uniformity and performance characteristics. For, instance, during vulcanization as the sealant material is degraded into a low viscosity material having the needed characteristics for a sealant, off-gassing results. This off-gassing frequently results in an undesirable expansion of the innerliner in cases where the sealant layer is situated between the innerliner and the supporting carcass or between two layers of innerliner. This expansion of the innerliner causes it to bubble which in turn results in poor tire uniformity and balance issues.

SUMMARY OF THE INVENTION

The method of this invention provides a simple and inexpensive method for manufacturing self-sealing pneumatic rubber tires of the tubeless type having a high degree of uniformity. In the tire building method of this invention a layer of polyisobutylene rubber containing at least one peroxide is assembled into an unvulcanized tire. In effect, the polyisobutylene rubber is partially degraded to form a tacky low viscosity material which has puncture sealing properties. In the method of this invention, a solid polyisobutylene composition is assembled into the unvulcanized rubber tire and the tire is vulcanized using conventional methods which converts the solid polyisobutylene rubber composition into a sealant layer. The peroxide utilized in the polyisobutylene rubber formulation is employed at as low of a level as possible to reduce the level of gas generation (off-gassing).

This invention more specifically discloses a sealant composition which is particularly useful in manufacturing self-sealing tires and which is comprised of (a) polyisobutylene, (b) a peroxide, and (c) a reinforcing filler, wherein the polyisobutylene is present in the sealant layer at a level of at least 50 weight percent polyisobutylene, based upon the total weight of elastomers in the sealant layer.

The subject invention further reveals an uncured pneumatic tire which is comprised of a generally toroidal-shaped carcass with an outer circumferential tread, two spaced beads, at least one ply extending from bead to bead, sidewalls extending radially from and connecting said tread to said beads, a sealant layer which is disposed inwardly from the supporting carcass, and an innerliner which is disposed inwardly from the sealant layer, wherein said circumferential tread is adapted to be ground-contacting, and wherein the sealant layer is comprised of (a) polyisobutylene, (b) a peroxide, and (c) a reinforcing filler, wherein the polyisobutylene is present in the sealant layer at a level of at least 50 weight percent, based upon the total weight of elastomers in the sealant layer.

The present invention also discloses a method of manufacturing a pneumatic rubber tire having a puncture sealing feature which comprises: (1) building an unvulcanized tire comprised of a circumferential rubber tread, a supporting carcass therefor, two spaced beads, two rubber sidewalls connecting said beads, an inner liner and a solid sealant formulation layer disposed inwardly from said supporting carcass and outwardly from said inner liner wherein said solid sealant formulation layer is comprised of (a) polyisobutylene, (b) a peroxide, and (c) a reinforcing filler, wherein the polyisobutylene is present in the sealant layer at a level of at least 50 weight percent, based upon the total weight of elastomers in the sealant layer; and (2) shaping and vulcanizing said tire in a tire mold under conditions of heat and pressure and simultaneously forming in situ a puncture sealant layer in said tire by both crosslinking and partially depolymerizing said polyisobutylene rubber in said sealant layer formulation.

One embodiment of this invention relates to a sealant composition which is comprised of (a) a polyisobutylene rubber and/or a butyl rubber, (b) a peroxide, and (c) a reinforcing filler, wherein the peroxide has an active oxygen content of at least 6% and which is preferably greater than 7%.

Another embodiment of this invention reveals a sealant composition which is comprised of (a) a polyisobutylene rubber and/or a butyl rubber, (b) a peroxide, and (c) polypropylene. It is typically preferred for the polypropylene to be low molecular weight polypropylene which has a weight average molecular weight which is within the range of about 4,000 to about 40,000.

BRIEF DESCRIPTION OF THE DRAWINGS

The present invention is further illustrated by the accompanying drawings. These drawings represent two preferred embodiments of the present invention.

DETAILED DESCRIPTION OF THE INVENTION

In the method of this invention a solid sealant layer formulation is assembled into an unvulcanized rubber tire using conventional tire building techniques. The solid sealant layer formulation is relatively easy to build into the tire because it is in the form of a solid which is not excessively sticky or tacky. The physical nature of the solid sealant layer formulation is such that its viscosity is high enough to permit easy handling during the construction (building) of the unvulcanized tire and during the vulcanization (curing) operation. In other words the solid sealant layer formulation has enough uncured strength (modulus) to retain its shape during building, enough tack to stick to adjacent layers during building and enough strength to retain its shape during the application of the high pressure during vulcanization. However, it also is not too tacky and does not stick to undesired materials, such as the building drum.

Figure 1:
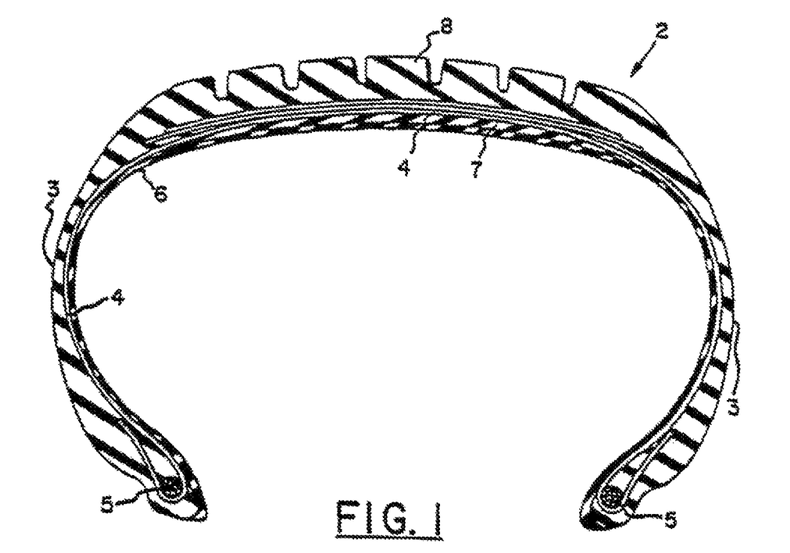
FIG. 1 is a cross-sectional view of a tire of this invention wherein the sealant layer is sandwiched between the innerliner and carcass of the tire.
Figure 2:
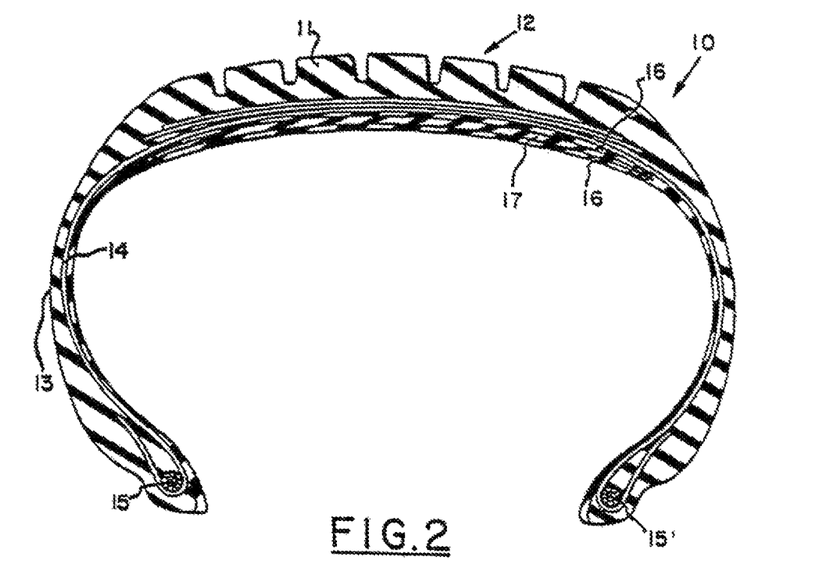
FIG. 2 is a cross-sectional view of a pneumatic rubber tire of this invention wherein the self-sealant layer of the tire is located between two layers of innerliner in the tire.

The solid sealant layer formulation is assembled into the uncured tire inwardly from the tire supporting carcass of the tire. In most cases it will be built into the tire between the supporting carcass and the innerliner of the tire as is illustrated in FIG. 1. The innerliner is an air barrier layer that serves to keep air or another gas, such as nitrogen, which is used to inflate the tire for escaping through the tire structure by diffusion. The innerliner is typically comprised of a halobutyl rubber or some other suitable material having a high degree of resistance to gas permeation. In another embodiment of this invention the solid sealant layer formulation is built into the tire between two layers of innerliner as is illustrated in FIG. 2. In other words, it is sandwiched between two or more layers of innerliner or between one or more innerliner layers and the tire carcass.

After an unvulcanized tire is built so as to include a layer of the solid sealant formulation it is vulcanized utilizing conventional techniques. After the unvulcanized pneumatic rubber tires of this invention are assembled they are vulcanized using a normal tire cure cycle. In the practice of this invention the unvulcanized tires can be cured over a wide temperature range, such as a temperature which is within the range of about 100° C. to about 200° C. However, it is generally preferred for the tires of this invention to be cured at a temperature ranging from about 130° C. to about 170° C. It is typically more preferred for the tires of this invention to reach a maximum temperature ranging from a 140° C. to 165° C. during vulcanization. For instance, it is typically optimal for the tire to reach a maximum curing temperature which is within the range of 160° C. to 165° C. It is generally preferable for the cure cycle used to vulcanize the uncured tires to have a duration which is within the range of about 8 minutes to about 60 minutes. In the practice of this invention the uncured tires with normally be cured for a period which is within the range of about 10 minutes to 25 minutes with the cure period preferably being from about 10 minutes to 17 minutes, and most preferably being within the range of about 11 minutes to 13 minutes. Any standard vulcanization process can be used such as heating in a press or mold and/or heating with superheated steam or hot air. In any case, the uncured tire can be built, shaped, molded and cured by various methods which are known and which are readily apparent to those having ordinary skill in the art.

During the vulcanization of the tire the polyisobutylene in the solid sealant formulation will partially depolymerize at the elevated vulcanization temperature to produce a highly effective puncture-sealant composition. Thus, the solid sealant layer formulation is transformed in situ into a puncture sealant layer during the curing of the tire. This puncture-sealant composition has a relatively low viscosity which allows it to flow into punctures so as to seal them thereby stopping or hindering the escape of the gas used to inflate the tire.

Tires made in accordance with this invention are depicted in FIG. 1 and FIG. 2. In FIG. 1 a self-sealing pneumatic rubber tire 2 of this invention is shown wherein the tire has sidewalls 3, a supporting carcass 4, inextensible beads 5, an innerliner (air barrier layer) 6, a sealant layer 7, and an outer circumferential tread (tread portion) 8. The individual sidewalls 3 extend radially inward from the axial outer edges of the tread portion 8 to join the respective inextensible beads 5. The supporting carcass 4 acts as a supporting structure for the tread portion 8 and sidewalls 3. The sealant layer 7 is disposed inwardly from said supporting carcass 4 and outwardly from said innerliner 6. The outer circumferential tread 8 is adapted to be ground contacting when the tire is in use. In this embodiment of the invention, the innerliner 6 is disposed inwardly from said supporting carcass 4.

In FIG. 2 a self-sealant pneumatic rubber tire 10 of another embodiment of this invention is depicted. This pneumatic tire of the tubeless type includes a tread portion 11, a crown area 12, sidewalls 13, a supporting carcass 14, inextensible beads 15, an innerliner 16, and sealant layer 17. In this embodiment of the present invention the sealant layer 17 is sandwiched between two layers of innerliner 16. This, sealant layer 17 is disposed inwardly from one layer of innerliner and outwardly from another layer of innerliner. Both layers of innerliner 16 and the sealant layer 17 are disposed inwardly from the supporting carcass 14.

The solid sealant layer formulation used in the practice of this invention is comprised of (a) polyisobutylene, (b) a peroxide, and (c) a reinforcing filler, wherein the polyisobutylene is present in the sealant layer at a level of at least 50 weight percent, based upon the total weight of elastomers in the sealant formulation. The polyisobutylene can represent at least 75 weight percent, at least 90 weight percent, at least 94 weight percent, at least 96 weight percent, at least 98 weight percent, or at least 99 weight percent, of the total weight of elastomers in the sealant formulation. In fact, the sealant layer formulation can be void of other elastomers. The solid sealant layer formulation will contain less than 50 weight percent butyl rubber, will typically contain less than 40 weight percent butyl rubber, will normally contain less than 20 weight percent butyl rubber, will preferably contain less than 10 percent butyl rubber, will more preferably contain less than 5 percent butyl rubber, and will most preferably contain less than 1 weight percent butyl rubber. The solid sealant layer formulation will typically be void of butyl rubber, halogenated butyl rubbers, natural rubber, synthetic polyisoprene rubber, emulsion styrene-butadiene rubber, solution styrene-butadiene rubber, isoprene-butadiene rubber, styrene-isoprene-butadiene rubber, styrene/butadiene diblock polymers, styrene/butadiene/styrene triblock polymers, neoprene, nitrile rubber, ethylene-propylene rubbers, and ethylene-propylene-diene monomer rubbers.

The polyisobutylene rubber (PIB) utilized in the practice of this invention is a high molecular weight homopolymer of isobutylene. It will typically have a weight average molecular weight which is within the range of 100,000 to 800,000, it will more typically have a weight average molecular weight which is within the range of 250,000 to 600,000, it will preferably have a weight average molecular weight which is with the range of 300,000 to 550,000, and it will more preferably have a weight average molecular weight which is within the range of 300,000 to 450,000. The polyisobutylene rubber will normally have a polydispersity (Mw/Mn) which is within the range of 2.0 to 2.8, and a glass transition temperature which is within the range of $-60°$ C. to $-68°$ C. The polyisobutylene rubber will also typically have a viscosity average molecular weight which is within the range of 300,000 to 600,000, a polydispersity (Mw/Mn) which is within the range of 2.1 to 2.7, and a glass transition temperature which is within the range of $-61°$ C. to $-67°$ C. The polyisobutylene rubber will preferably have a viscosity average molecular weight which is within the range of 350,000 to 550,000, a polydispersity (Mw/Mn) which is within the range of 2.2 to 2.6, and a glass transition temperature which is within the range of $-62°$ C. to $-66°$ C. The polyisobutylene rubber will more preferably have a viscosity average molecular weight which is within the range of 400,000 to 450,000, a polydispersity (Mw/Mn) which is within the range of 2.3 to 2.5, and a glass transition temperature which is within the range of $-63°$ C. to $-65°$ C. The polyisobutylene rubber will most preferably have a viscosity average molecular weight which is within the range of 375,000 to 500,000, a polydispersity (Mw/Mn) of about 2.4, and a glass transition temperature of about $-64°$ C. The polyisobutylene rubber can optionally be stabilized with a small amount of an antioxidant, such as from about 100 ppm to 1,000 ppm of an antioxidant. Such antioxidants will typically be incorporated into the polyisobutylene rubber at a level of about 300 ppm to about 700 ppm. A wide variety of antioxidants can be employed with butylated hydroxytoluene (BHT) typically being used.

The peroxide compounds utilized in the practice of this invention are those generally used for the crosslinkage of rubbery polymers. Preferably peroxide compounds which disintegrate only at high temperatures, above about $100°$ C. are utilized. Some representative examples of such peroxides include tert-butyl perbenzoate and dialkyl peroxides with the same or different radicals, such as dialkylbenzene peroxides and alkyl peresters. Preferably the peroxide vulcanizing agent employed will contain two peroxide groups. Frequently the peroxide groups are attached to a tertiary-butyl group. The basic moiety on which the two peroxide groups are suspended can be aliphatic, cycloaliphatic, or aromatic radicals. Some representative examples of such peroxide include: bis($\alpha,\alpha$-dimethylbenzyl) peroxide (more commonly known as dicumyl peroxide); 2,5-bis(t-butyl peroxy)-2,5-dimethyl hexane; 1,1-di-t-butyl peroxy-3,3,5-trimethyl cyclohexane; 2,5-dimethyl-2,5-di(t-butyl peroxy) hexyne-3; p-chlorobenzyl peroxide; 2,4-dichlorobenzyl peroxide; 2,2-bis-(t-butyl peroxy)-butane; di-t-butyl peroxide; benzyl peroxide; 2,5-bis(t-butyl peroxy)-2,5-dimethyl hexane; and 2,5-dimethyl-2,5-di(t-butyl peroxy) hexane. Such peroxide vulcanizing agents can be added to the polymer composition layer in pure form (100 percent active peroxide), but are typically employed on an inert, free-flowing mineral carrier or an oil, such as silicon oil. Calcium carbonate is an inert mineral carrier which is frequently utilized for this purpose. Such peroxide carrier compositions normally containing from about 30 weight percent to 55 weight percent active peroxide and typically contain from 35 weight percent to 50 weight percent active peroxide. For instance, the peroxide carrier composition can contain from about 38 weight percent to about 43 weight percent active peroxide, such as dicumyl peroxide, on a mineral carrier, such as calcium carbonate. The peroxide will normally be included in the solid sealant layer formulation used in the practice of this invention at a level which is within the range of 2 phr to 7 phr (based upon active peroxide) and will typically be present at a level which is within the range of 2.5 phr to 5 phr. It is preferred for the peroxide to be present at a level which is within the range of 3 phr to 4.2 phr and is more preferably included at a level which is within the range of 3.5 phr to 4 phr. The term "phr" stands for parts by weight per 100 parts by weight of rubber.

In the practice of this invention it is preferred to utilize a peroxide that has an active oxygen content (AOC) of at least 6. Active oxygen content is determined by dividing the weight of active oxygen atoms in the compound by its total molecular weight (this is done on the basis of one active oxygen atom for each peroxide moiety (—O—O—) in the compound. For example, t-butyl cumyl peroxide has one active oxygen atom (molecular weight of 16) and a total molecular weight of 208. Accordingly, the active oxygen content of t-butyl cumyl peroxide is 16/208 which is 0.077 or 7.7%. In any case, peroxides having active oxygen contents of greater than 7%, 8%, 9%, or even 10% are highly preferred. This is because they generate less gas during the tire curing process than do peroxides having lower active oxygen contents. For this reason, benzoyl peroxide (AOC of 6.5), t-butyl cumyl peroxide (AOC of 7.7), and di-t-butyl peroxide (AOC of 11.0%) are preferred for use in the practice of this invention. It should also be noted that these peroxides can also be utilized beneficially in conventional butyl rubber based sealant formulations that include typically compounding ingredients as described herein.

A reinforcing filler is included in the solid sealant layer formulation to give it a consistency which facilitates building it into uncured tires. A wide variety of reinforcing fillers can be used for this purpose. For example, the filler can be carbon black, graphite, graphene, carbon nanotubes, wollastonite, silica, crystalline silica, clay, 2:1 layered silicate clays, talc, diatomaceous earth, calcium carbonate ($CaCO_3$), calcium silicate, starch, lignin, alumina, or polypropylene. The 2:1 layered silicate clays that are typically preferred include montmorillonite, bentonite, hectorite, saponite, nontronite, beidellite, fluorohectorite, stevensite, volkonskoite, sauconite laponite, related analogs thereof and their physical blends. Clays that have been chemically modified to make them compatible with organic materials are preferred and are generally referred to as "organophilic" clays or "organoclays". The basic starting material used to make organophilic clay is an exchangeable clay of the smectite group and can include montmorillonite (commonly known and mined as bentonite), hectorite, saponite, attapulgite and sepolite. These clays include exchangeable cationic species such as sodium, potassium or calcium ions on their surface and between clay galleries or layers. In the course of manufacturing an organophilic clay, at least a portion of these exchangeable cationic species are substituted by an organic cation such as a quaternary amine, an organophosphorus ion, any other ion of the type known in the art as an onium ion, or the like.

The graphene that can be used in the solid sealant layer formulations of this invention is a one-atom-thick crystalline form of carbon in which carbon atoms are held together by sigma bonds that are arranged in a two-dimensional honeycomb lattice. More specifically graphene is a crystalline allotrope of carbon with 2-dimensional properties. The carbon atoms in graphene are densely packed in a regular atomic-scale hexagonal (chicken wire) pattern. Each atom has four bonds, one σ bond with each of its three neighbors and one H-bond that is oriented out of plane. The distance between adjacent carbon atoms in graphene is approximately 0.142 nanometers. The graphene that can be advantageously used as a reinforcing filler in the practice of this invention can have zig-zag, armchair, K-region, gulf, bay, cove, and fjord edge topologies. Typically, at least 50 percent, 60 percent, 70 percent, or 80 percent of the carbon-carbon bonds on the edges of the graphene structure will be in the zig-zag configuration, the armchair configuration, or the bay configuration. In many cases, at least 40 percent, 50 percent, or 60 percent of the carbon-carbon bonds on the edges of the graphene structure will be in the zig-zag configuration. In one embodiment at least 40 percent, 50 percent, or 60 percent of the carbon-carbon bonds on the edges of the graphene structure will be in the armchair configuration. In another embodiment at least 40 percent, 50 percent, or 60 percent of the carbon-carbon bonds on the edges of the graphene structure will be in the bay configuration. Typically, less than 40 percent of the carbon-carbon bonds on the edges of the graphene structure will be in the cove configuration and more typically less than 30 percent of the carbon-carbon bonds on the edges of the graphene structure will be in the cove configuration. In another embodiment less than 40 percent of the carbon-carbon bonds on the edges of the graphene structure will be in the cove configuration and less than 30 percent or more typically less than 20 percent of the carbon-carbon bonds on the edges of the graphene structure will be in the fjord configuration.

The graphene that can optionally be used as a reinforcing filler in the practice of this invention is exfoliated into nano-scaled graphene plate (NGP) material that is essentially comprised of individual single sheets of graphene or a plurality of sheets of graphite planes. Each graphite plane, also referred to as a graphene plane or basal plane and is comprised of a two-dimensional hexagonal structure of carbon atoms. Each plane has a length and a width parallel to the graphite plane and a thickness orthogonal to the graphite plane characterized in that at least one of the values of length, width, and thickness is 100 nanometers (nm) or smaller. Preferably, all length, width and thickness values are smaller than 100 nm. This NGP material can be produced by a process the method described in U.S. Pat. No. 7,071,258 which comprising the steps of: (a) carbonization or graphitization to produce a polymeric carbon, (b) exfoliation or expansion of graphite crystallites in the polymeric carbon to delaminate or separate graphene planes, and (c) mechanical attrition of the exfoliated structure to nanometer-scaled plates. The teachings of U.S. Pat. No. 7,071,258 are incorporated herein by references for the purpose or describing graphene that can be utilized in the practice of this invention and methods for manufacturing such graphene. In the practice of this invention it is preferred for the graphene to be comprised of individual single sheets of graphene (single graphene planes or single basal planes).

The reinforcing filler is typically included at a level which is within the range of about 10 phr to about 75 phr and is more typically included at a level which is within the range of 20 phr to 50 phr. The reinforcing filler is normally included at a level which is within the range of about 25 phr to about 45 phr, is preferably included at a level which is within the range of 30 phr to 40 phr, and is more preferably included at a level which is within the range of 32 phr to 38 phr. In cases where polypropylene is utilized as a filler lower levels are required since it has been found to be highly effective. More specifically, in cases where polypropylene is used as a filler about 35 percent to 40 percent less material is required than is the case with conventional fillers, such as carbon black and mineral fillers. The use of polypropylene as a filler also offers an additional advantage in that it breaks down during the curing of the tire to work in conjunction with the polyisobutylene rubber as a sealant. In other words, polypropylene offers a unique advantage in that it acts both as a filler in building the tire and subsequently as a sealant in the cured tire. Low molecular weight polypropylene is preferred for use as a filler in the practice of this invention. Such low molecular weight polypropylene typically has a weight average molecular weight ($M_w$) which is within the range of about 4,000 to about 40,000. The low molecular weight polypropylene will normally have a weight average molecular weight which is within the range of 6,000 to 25,000, will preferably have a weight average molecular weight which is within the range of 8,000 to 20,000, and will most preferably have a weight average molecular weight which is within the range of 10,000 to 15,000. It should also be noted that polypropylene can also be beneficially utilized in conventional butyl rubber based sealant formulations that include typically compounding ingredients as described herein.

The solid sealant layer formulation used in the practice of this invention can optionally include one or more processing oils. A wide variety of processing oils can be used. Suitable processing oils may include various oils as are known in the art, including aromatic, paraffinic, naphthenic, triglyceride oils, and low PCA oils, such as MES, TDAE, SRAE and heavy naphthenic oils. Suitable low PCA oils may include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom. The triglyceride oils that can be used include vegetable oils, including but not limited to vegetable oils, soybean oil, canola oil (Rapeseed oil), corn oil, cottonseed oil, olive oil, palm oil, safflower oil, sunflower oil, coconut oil, and peanut oil. Castor oil, soybean oil, and corn oil are preferred oils for use in the solid sealant layer formulations of this invention. Castor oil is a triglyceride oil that contains approximately 87 percent ricinoleic acid, 7 percent oleic acid, 3 percent linoleic acid, 2 percent palmitic acid, and 1 percent stearic acid. The processing oil will typically be employed at a level which is within the range of about 1 phr to about 20 phr and will more typically be employed at a level which is within the range of 1 phr to 10 phr. In most cases the processing oil will be included at a level which is within the range of about 2 phr to about 5 phr and will preferably be employed at a level which is within the range of 2 phr to 4 phr.

Various pigments or colorants can also optionally be included in the sealant formulations of this invention. By including one or more pigments or colorants in the sealant formulation the fact that the tire has in fact been punctured and the location of puncture can more readily be identified. A wide variety of colors can be used for this purpose with lights colors which stand out from the characteristic black color of tire treads being preferred. For example, white, red, orange, yellow, green, or blue pigments or colorants can optionally be included. Titanium dioxide can be utilized to impart a brilliant white color, red iron pigment can be used to impart a brilliant red color, or pigment yellow 12 can be used to impart a brilliant yellow color. The pigment or colorant will typically be utilized in a quantity that will make punctures in the tire more readily apparent and will normally be used at a level which is within the range about 1 phr to about 5 phr, and will preferably be used at a level which is within the range of 2 phr to 4 phr.

Both organic and inorganic pigments can be utilized. In most cases the pigment or colorant will be of a white, red, orange, yellow, green, or blue color. Some representative examples of pigments that can be utilized include, but are not limited to, Pigment Yellow 1 (CAS No. 2512-29-0), Pigment Yellow 110 (CAS No. 5590-18-1), Pigment Yellow 12 (CAS No. 15541-56-7), Pigment Yellow 126 (CAS No. 90268-23-8), Pigment Yellow 127 (CAS No. 68610-86-6), Pigment Yellow 13 (CAS No. 5102-83-0), Pigment Yellow 138 (CAS No. 30125-47-4), Pigment Yellow 14 (CAS No. 5468-75-7), Pigment Yellow 150 (CAS No. 68511-62-6), Pigment Yellow 151 (CAS No. 31837-42-0), Pigment Yellow 154 (CAS No. 68134-22-5), Pigment Yellow 168 (CAS No. 71832-85-4), Pigment Yellow 17 (CAS No. 4531-49-1), Pigment Yellow 174 (CAS No. 78952-72-4), Pigment Yellow 180 (CAS No. 77804-81-0), Pigment Yellow 183 (CAS No. 65212-77-3), Pigment Yellow 191 (CAS No. 129423-54-7), Pigment Yellow 3 (CAS No. 6486-23-3), Pigment Yellow 34 (CAS No. 1344-37-2), Pigment Yellow 42 (CAS No. 51274-00-1), Pigment Yellow 65 (CAS No. 6528-34-3), Pigment Yellow 74 (CAS No. 6358-31-2), Pigment Yellow 75 (CAS No. 52320-66-8), Pigment Yellow 81 (CAS No. 22094-93-5), Pigment Yellow 83 (CAS No. 5567-15-7), C.I. Pigment Yellow 42 (iron oxide), C.I. Pigment Yellow 34 (lead chromates), C.I. Pigment Yellow 184 (bismuth vanadates), C.I. Pigment Yellow 53 (nickel antimony), C.I. Pigment Orange 20 (cadmium sulfide), C.I. Pigment Red 101 (iron oxide), C.I. Pigment Red 104, C.I. Pigment Red 29 (ultramarine pigment), C.I. Pigment Blue 29 (ultramarine pigment), C.I. Pigment Blue 28, C.I. Pigment Blue 36, C.I. Pigment Violet 15 (ultramarine pigment), C.I. Pigment Violet 16 (manganese violet), Pigment Green 17 (chrome oxide green), C.I. Pigment Green 19 (cobalt-based mixed metal oxides), C.I. Pigment Green 26 (cobalt-based mixed metal oxides), and C.I. Pigment Green 50 (cobalt-based mixed metal oxides).

Some additional inorganic pigments that can be used include Ultramarine blue, Persian blue, Cobalt blue (CAS No. 1345-16-0), Curlean blue, Egyptian blue, Han blue ($BaCuSi_4O_{10}$), Azurite blue ($Cu_3(CO_3)_2(OH)_2$, Prussian blue (CAS No. 14038-43-8), YInMn blue (Oregon blue), Realgar red ($\alpha$-$As_4S_4$), cadmium red ($Cd_2SSe$), Cerium sulfide red, Venetian red ($Fe_2O_3$), Red Ochre (anhydrous $Fe_2O_3$), Burnt sienna red, Red lead ($Pb_3O_4$), Vermilian red, Cinnabar red, Ultramarine violet, Han purple ($BaCuSi_2O_6$), Cobalt violet ($CO_3(PO_4)_2$), Manganese violet ($NH_4MnP_2O_7$), Purple of Cassius, Primrose yellow ($BiVO_4$), Cadmium yellow (CdS), Chrome yellow ($PbCrO_4$), Aureolin yellow ($K_3Co(NO_2)_6$), Yellow Ochre ($Fe_2O_3 \cdot H_2O$), Naples yellow, Titanium yellow ($NiO \cdot Sb_2O_3 \cdot 20TiO_2$), Zinc yellow ($ZnCrO_4$), and Chrome orange ($PbCrO_4$—PbO).

Polyethylene glycol can also optionally be included in the sealant formulations of this invention. The polyethylene glycol will typically have a molecular weight which is within the range of 500 to 12,000 and will more typically have a molecular weight which is within the range of 4,000 to 8,000. In cases where polyethylene glycol is utilized it will typically be included at a level which is within the range of about 0.1 phr to about 2 phr, preferably 0.2 phr to 1 phr, and most preferably 0.3 phr to 0.7 phr.

The various components of the solid sealant layer formulation can be mixed together using any convenient rubber mixing equipment, such as a Banbury mixer or a mill mixer. In any case, this rubber composition should have sufficient viscosity and unvulcanized adhesion (green strength) to enable its incorporation into an unvulcanized tire without departing from standard, long standing tire building techniques and without the use of complicated auxiliary tire building equipment. In the method of this invention, the polymer composition can be formed into a strip of unvulcanized rubber that is assembled into the tire.

The strip of puncture sealant formulation employed should extend from one shoulder of the tire to the other, in other words, it should cover the crown area of the tire. The thickness of the sealant layer can vary greatly in an unvulcanized puncture sealant tire. Generally, the thickness of the polymer composition layer will range from about 0.2 mm to about 8.5 mm. It is generally preferred for the sealant composition layer to have a thickness of 3 mm to 6 mm and is typically most preferred for the sealant layer to have a thickness which is within the range of 4 mm to 5 mm. In passenger tires it is normally most preferred for the polymer composition layer to have a thickness of about 4.5 mm.

In one scenario tires can be built in accordance with this invention by first applying an innerliner to a building drum with the strip of the sealant formulation of this invention subsequently being applied to the layer of innerliner. After the strip of sealant formulation is assembled into the unvulcanized tire other normal tire components can then be assembled into the tire using standard, known procedures. In this scenario the sealant layer will be sandwiched between the innerliner and the tire carcass. In another embodiment of this invention a second layer of innerliner can be applied on top of the sealant formulation with the carcass subsequently being applied on top of the second sealant layer. In this embodiment the sealant formulation will be sandwiched between the two layers of innerliner. In other words, the sealant composition can be built into the tire so as to be sandwiched between two layers of innerliner or between a layer of innerliner and the carcass of the tire.

The following examples are included to further illustrate the method of manufacturing the self-sealing pneumatic rubber tires of this invention. These examples are intended to be representative of the present invention and are not to be regarded as limiting the scope of the invention or the manner in which it can be practiced. Unless specifically indicated otherwise, parts and percentages are given by weight.

Example 1 and Comparative Examples 2-4

In this series of experiments sealant compositions were prepared and cured with dicumyl peroxide into test strips for evaluation. In the procedures used non-productive formulations were made first and then the dicumyl peroxide was added to make productive formulations. The composition of each of the formulations evaluated in this series of experiments is shown in Table 1 with all levels being designated in parts by weight. Comparative Example 2 which contained only butyl rubber and no polyisobutylene rubber was cured using 5.7 parts by weight of dicumyl peroxide. The formulations of Example 1 and Comparative Examples 3 and 4 included three different levels of dicumyl peroxide as shown in Table 1. The levels of the various materials delineated in Table 1 are given in parts by weight.

TABLE 1

|  | Example 1 | Example 2[1] | Example 3[1] | Example 4[1] |
| --- | --- | --- | --- | --- |
| Polyisobutylene Rubber[2] | 100 | — | 50 | 75 |
| Butyl Rubber | — | 100 | 50 | 25 |
| Amorphous Silica[3] | 17 | 17 | 17 | 17 |
| Kaolin Clay[4] | 10 | 10 | 10 | 10 |
| Titanium Dioxide[5] | 2 | 2 | 2 | 2 |
| Medium Process Oil[6] | 3 | 3 | 3 | 3 |
| Yellow Pigment[7] | 0.8 | 0.8 | 0.8 | 0.8 |
| Polyethylene Glycol (MW = 6.000) | 0.5 | 0.5 | 0.5 | 0.5 |

TABLE 1-continued

|  | Example 1 | Example 2[1] | Example 3[1] | Example 4[1] |
| --- | --- | --- | --- | --- |
| Dicumyl Peroxide[8] (active) | 2.0/3.8/5.7 | 5.7 | 2.0/3.8/5.7 | 2.0/3.8/5.7 |

[1]Examples 2-4 are comparative examples.
[2]Oppanol ® N50 polyisobutylene rubber ($M_v$ = 425,000; $M_w$ = 565,000; $M_w/M_n$ = 2.4; Tg = −64° C.; and Staudinger Index Jo = 128-150 cm3/g in isooctane @ 20° C.)
[3]HI-SIL 532 EP synthetic amorphous silica from PPB Industries, Inc.
[4]Polyfil HG 90 kaolin clay from Kamin
[5]Cotiox KA 100 titanium dioxide from Cosmo Chemical Company
[6]Hyprene 100 medium process oil from Ergon Refining
[7]E-6837 yellow pigment 12 in EPR (50%/50%) from Akrochem
[8]Di-Cup 40C dicumyl peroxide on precipitated calcium carbonate (40.5% active) from Arkema Inc.
Note:
The levels indicated in Table 1 are levels of active dicumyl peroxide.

Table 2 shows the storage modulus of the cured samples at the three different levels of dicumyl peroxide used to cure the samples. It should be noted that in Comparative Example 2 (which used 100% butyl rubber as its only rubber component) only the sample using the highest level of dicumyl peroxide was prepared which was necessary to reduce the storage modulus to a sufficient level for utilization as a puncture sealant.

TABLE 2

|  | Example 1 | Example 2 | Example 3 | Example 4 |
| --- | --- | --- | --- | --- |
| Level of dicumyl peroxide (active) | G' @ 5% (40° C.) in MPa | | | |
| 2.0 phr | 1.008 | — | 0.140 | 0.140 |
| 3.8 phr | 0.040 | — | 0.060 | 0.047 |
| 5.7 phr | 0.020 | 0.066 | 0.030 | 0.022 |

As can be seen from Table 2, the storage modulus of the samples was reduced with increasing levels of peroxide. Table 2 also shows that the reduction in storage modulus attained also increased with increasing levels of polyisobutylene rubber in the formulations. Table 2 further shows that a satisfactory storage modulus of less than about 0.070 MPa can be attained in formulations that contain a high level of polyisobutylene rubber. In fact, a storage modulus of about 0.040 MPa (within the range of 0.030 MPa to 0.050 MPa) was attained in Example 1 which was cured utilizing only 3.8 phr of dicumyl peroxide.

These puncture sealant formulations were also evaluated to determine the level of innerliner expansion that resulted. This was accomplished by curing the sealant formulations between two layers of innerliner and measuring the level of expansion that occurred on curing. Expansion was measured immediately after the samples came out of the cure press. The results of this testing are reported in Table 3. The reduction in expansion is reported as compared to the butyl rubber control (Comparative Example 1).

TABLE 3

|  | Expansion | Expansion Reduction |
| --- | --- | --- |
| Comparative Example 2 | 3.2 cm | — |
| Example 1 at 2.0 peroxide level | 1.4 cm | 56.3% |
| Example 1 at 3.8 phr peroxide level | 2.2 cm | 31.3% |

As can be seen from Table 3, the use of the puncture sealant formulation of this invention resulted in significantly lower levels of innerliner expansion as compared to conventional puncture sealant formulations. It can accordingly be used in manufacturing pneumatic tires having better uniformity and better balance characteristics. Additionally, it can be easily built into tires using standard techniques without compromising puncture sealing capabilities.

Examples 5 and 6

In this experiment a polyisobutylene rubber based sealant formulation was made in accordance with this invention using low molecular weight polypropylene as a filler and was compared to a similar sealant formulation which were made utilizing conventional fillers (synthetic amorphous silica and clay). These formulations are further described in Table 3. It should be noted that the sealant formulation of Example 5 is identical to the formulation previously described in Example 1 at the 5.7 parts by weight level of dicumyl peroxide. The sealant composition of Example 6 was made so as to have the same equivalent volume fraction of polypropylene as the volume fraction of fillers in the sealant composition of Example 5. It should be noted that the levels of all of the materials delineated in Table 4 are given in parts by weight.

TABLE 4

|  | Example 5 | Example 6 |
|---|---|---|
| Polyisobutylene Rubber[1] | 100 | 100 |
| Low Molecular Weight PP[2] | — | 14.3 |
| Amorphous Silica[3] | 17 | — |
| Kaolin Clay[4] | 10 | — |
| Titanium Dioxide[5] | 2 | — |
| Medium Process Oil[6] | 3 | — |
| Yellow Pigment[7] | 0.8 | — |
| Polyethylene Glycol (MW = 6.000) | 0.5 | — |
| Dicumyl Peroxide[8] (active) | 3.8 | 3.6 |

[1]Oppanol ® N50 polyisobutylene rubber ($M_v$ = 425,000; $M_w$ = 565,000; $M_w/M_n$ = 2.4; Tg = −64° C.; and Staudinger Index Jo = 128-150 cm3/g in isooctane @ 20° C.)
[2]The polypropylene (PP) had a weight average molecular weight of about 12,000
[3]HI-SIL 532 EP synthetic amorphous silica from PPB Industries, Inc.
[4]Polyfil HG 90 kaolin clay from Kamin
[5]Cotiox KA 100 titanium dioxide from Cosmo Chemical Company
[6]Hyprene 100 medium process oil from Ergon Refining
[7]E-6837 yellow pigment 12 in EPR (50%/50%) from Akrochem
[8]Di-Cup 40C dicumyl peroxide on precipitated calcium carbonate (40.5% active) from Arkema Inc.
Note:
The levels indicated in Table 4 are levels of active dicumyl peroxide.

The storage modulus G' of these sealant formulations was determined at temperatures from 40° C. up to 100° C. as reported in Table 5.

TABLE 5

| Temperature | Example 5 (Conventional Fillers) | Example 6 (PP Filler) |
|---|---|---|
| 40° C. | 0.039 MPa | 0.036 MPa |
| 50° C. | 0.026 MPa | 0.021 MPa |
| 60° C. | 0.018 MPa | 0.012 MPa |
| 70° C. | 0.015 MPa | 0.007 MPa |
| 80° C. | 0.013 MPa | 0.008 MPa |
| 90° C. | 0.013 MPa | 0.008 MPa |
| 100° C. | 0.012 MPa | 0.008 MPa |

As can be seen from Table 5, all of the sealant formulations made utilizing the low molecular weight polypropylene exhibited a lower level of storage modulus at equivalent temperatures. At higher temperatures this difference became more pronounced. The sealant formulation made with the polypropylene also appeared to handle and process better and more easily. In cases where low molecular weight polypropylene is used as a filler it is also possible to employ a lower level of peroxide to attain the desired storage modulus. This accordingly makes it possible to employ a lower level of peroxide which will further reduce the level of gas generated during curing.

Examples 7-8 and Comparative Example 9

In this series of experiment dicumyl peroxide, benzoyl peroxide, and t-butyl cumyl peroxide were evaluated for use in butyl rubber sealant formulations. These formulations are further described in Table 6. It should be noted that dicumyl peroxide was evaluated in as a control in Comparative Example 9. The levels of benzoyl peroxide and t-butyl cumyl peroxide used in Examples 7 and 8 were adjusted as needed to attain a decrease in storage modulus which was equivalent to the reduction realized in the control. More specifically, the required quantity of peroxides was used to reduce the storage modulus of the sealant compositions to a level of approximately 0.08 MPa. In any case, the levels of the various materials delineated in Table 6 are given in parts by weight.

TABLE 6

|  | Example 7 | Example 8 | Example 9[1] |
|---|---|---|---|
| Butyl Rubber | 100 | 100 | 50 |
| Amorphous Silica[2] | 17 | 17 | 17 |
| Kaolin Clay[3] | 10 | 10 | 10 |
| Medium Process Oil[4] | 3 | 3 | 3 |
| Polyethylene Glycol (MW = 6.000) | 0.5 | 0.5 | 0.5 |
| Dicumyl Peroxide[5] (AOC of 5.86%) | — | — | 5.7 |
| Benzoyl peroxide (AOC of 6.5%) | 9 | — | — |
| t-butyl cumyl peroxide (AOC of 7.7%) | — | 10 | — |
| Height of Gas Bubbles | 1.4 cm | ~2 cm[6] | 3.3 cm |

[1]Example 9 is a comparative example.
[2]HI-SIL 532 EP synthetic amorphous silica from PPB Industries, Inc.
[3]Polyfil HG 90 kaolin clay from Kamin
[4]Hyprene 100 medium process oil from Ergon Refining
[5]Di-Cup 40C dicumyl peroxide on precipitated calcium carbonate (40.5% active) from Arkema Inc.
Note:
The levels indicated in Table 6 are levels of active dicumyl peroxide.
[6]The level of expansion was not measured precisely, but appeared to be about 2 cm. In any case, it is far less expansion than was experiences in the case of the control.

This series of experiments shows that a smaller degree of gas generation results in cases where peroxides having high active oxygen contents are used in making the sealant formulations. Such peroxides can accordingly be beneficially utilized in making the polyisobutylene based sealant formulations of this invention as well as in making conventional butyl rubber based sealant formulations. Such butyl rubber based sealant formulations can, of course, also include additional ingredients, such as the reinforcing fillers, oils, ethylene glycol, colorants, and pigments previously described herein.

Variations in the present invention are possible in light of the description of it provided herein. The illustrations and corresponding descriptions are not intended to restrict or limit the scope of the appended claims in any way. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A sealant composition which is comprised of (a) polyisobutylene, (b) a peroxide, and (c) a reinforcing filler, wherein the reinforcing filler includes polypropylene, wherein the polypropylene is low molecular weight polypropylene having a weight average molecular weight which is within the range of about 4,000 to about 40,000, and wherein the polyisobutylene is present in the sealant composition at a level of at least 50 weight percent, based upon the total weight of elastomers in the sealant composition.

2. The sealant composition as specified in claim 1 wherein said sealant composition is void of butyl rubber and halogenated butyl rubber.

3. The sealant composition as specified in claim 1 wherein peroxide is present at a level which is within the range of 1 phr to 14 phr.

4. The sealant composition as specified in claim 1 wherein peroxide is present at a level which is within the range of 1 phr to 5 phr.

5. The sealant composition as specified in claim 1 wherein peroxide is present at a level which is within the range of 3.5 phr to 5 phr.

6. The sealant composition as specified in claim 1 wherein the peroxide has an active oxygen content of at least 6%.

7. The sealant composition as specified in claim 1 wherein the peroxide has an active oxygen content of at least 8%.

8. The sealant composition as specified in claim 1 wherein the peroxide has an active oxygen content of at least 10%.

9. The sealant composition as specified in claim 1 wherein said sealant composition is void of reinforcing fillers other than the polypropylene and carriers for the peroxide.

10. The sealant composition as specified in claim 1 wherein said sealant composition is void of reinforcing fillers other than polypropylene.

11. A sealant composition which is comprised of (a) polyisobutylene, (b) a peroxide, and (c) a reinforcing filler, wherein the polyisobutylene is present in the sealant composition at a level of at least 50 weight percent, based upon the total weight of elastomers in the sealant composition, and wherein said sealant composition is further comprised of a red, orange, yellow, green, or blue pigment or colorant, and wherein said sealant composition is void of carbon black.

12. The sealant composition as specified in claim 1 wherein said sealant composition is void of natural rubber, synthetic polyisoprene rubber, emulsion styrene-butadiene rubber, solution styrene-butadiene rubber, isoprene-butadiene rubber, styrene-isoprene-butadiene rubber, styrene/butadiene diblock polymers, styrene/butadiene/styrene triblock polymers, neoprene, nitrile rubber, ethylene-propylene rubbers, and ethylene-propylene-diene monomer rubbers.

13. A sealant composition which is comprised of (a) a polyisobutylene and/or a butyl rubber, (b) a peroxide, and (c) polypropylene.

14. The sealant composition as specified in claim 13 wherein the polypropylene is low molecular weight polypropylene which has a weight average molecular weight which is within the range of about 4,000 to about 40,000, wherein the peroxide is present at a level which is within the range of 1 phr to 5 phr, and wherein the peroxide has an active oxygen content of at least 8%.

15. An uncured pneumatic tire which is comprised of a generally toroidal-shaped supporting carcass with an outer circumferential tread, two spaced beads, at least one ply extending from bead to bead, sidewalls extending radially from and connecting said tread to said beads, a sealant layer which is disposed inwardly from the supporting carcass, and an innerliner which is disposed inwardly from the sealant layer, wherein said circumferential tread is adapted to be ground-contacting, and wherein the sealant layer is the sealant composition of claim 1.

16. An uncured pneumatic tire which is comprised of a generally toroidal-shaped supporting carcass with an outer circumferential tread, two spaced beads, at least one ply extending from bead to bead, sidewalls extending radially from and connecting said tread to said beads, a sealant layer which is disposed inwardly from the supporting carcass, and an innerliner which is disposed inwardly from the sealant layer, wherein said circumferential tread is adapted to be ground-contacting, and wherein the sealant layer is the sealant composition of claim 13.

17. A method of manufacturing a pneumatic rubber tire having a puncture sealing feature which comprises: (1) building an unvulcanized tire comprised of a circumferential rubber tread, a supporting carcass therefor, two spaced beads, two rubber sidewalls connecting said beads, an inner liner and a solid sealant formulation layer disposed inwardly from said supporting carcass and outwardly from said inner liner, wherein said solid sealant formulation layer is comprised of the sealant composition as specified in claim 1; and (2) shaping and vulcanizing said tire in a tire mold under conditions of heat and pressure and simultaneously forming in situ a puncture sealant layer in said tire by both cross-linking and partially depolymerizing said polyisoprene rubber in said sealant formulation layer.

18. A method of manufacturing a pneumatic rubber tire having a puncture sealing feature which comprises: (1) building an unvulcanized tire comprised of a circumferential rubber tread, a supporting carcass therefor, two spaced beads, two rubber sidewalls connecting said beads, an inner liner and a solid sealant formulation layer disposed inwardly from said supporting carcass and outwardly from said inner liner, wherein said solid sealant formulation layer is comprised of the sealant composition as specified in claim 13; and (2) shaping and vulcanizing said tire in a tire mold under conditions of heat and pressure and simultaneously forming in situ a puncture sealant layer in said tire by both cross-linking and partially depolymerizing said polyisoprene rubber in said sealant formulation layer.

19. The sealant composition as specified in claim 13 wherein the sealant composition includes polyisobutylene.

20. A method of manufacturing a pneumatic rubber tire having a puncture sealing feature which comprises: (1) building an unvulcanized tire comprised of a circumferential rubber tread, a supporting carcass therefor, two spaced beads, two rubber sidewalls connecting said beads, an inner liner and a solid sealant formulation layer disposed inwardly from said supporting carcass and outwardly from said inner liner, wherein said solid sealant formulation layer is comprised of the sealant composition as specified in claim 11; and (2) shaping and vulcanizing said tire in a tire mold under conditions of heat and pressure and simultaneously forming in situ a puncture sealant layer in said tire by both cross-linking and partially depolymerizing said polyisoprene rubber in said sealant formulation layer.

* * * * *